United States Patent
Lee

(12) United States Patent    (10) Patent No.: US 6,171,013 B1
Lee    (45) Date of Patent: Jan. 9, 2001

(54) DEVICE FOR COUPLING A CORNER STRUT BY ASSEMBLING COMPONENTS

(76) Inventor: Yaun Hi Lee, Hiyoung Rainbow Apart#101/1101 521-1 Kamjung-ri Kimpo-eup Kimpo-gun, Kyunggi-do (KR)

( * ) Notice: Under 35 U.S.C. 154(b), the term of this patent shall be extended for 0 days.

(21) Appl. No.: 09/156,997

(22) Filed: Sep. 18, 1998

(30) Foreign Application Priority Data

Sep. 18, 1997 (KR) ................................................ 97-26461

(51) Int. Cl.$^7$ ...................................................... F16B 9/02
(52) U.S. Cl. ........................... 403/231; 403/205; 248/188
(58) Field of Search ..................................... 403/230, 231, 403/205, 403, 401, 402; 243/188; 108/192, 193, 106, 107, 147.13, 147.14, 147.15

(56) References Cited

U.S. PATENT DOCUMENTS

| | | | |
|---|---|---|---|
| 169,613 | * 11/1875 | Balsley | 248/188 |
| 239,838 | * 4/1881 | Pleukharp | 248/188 |
| 1,876,336 | * 9/1932 | McLaughlin | 248/188 |
| 1,901,947 | 3/1933 | Bescherer | 248/649 X |
| 2,855,255 | 10/1958 | Sonderstrup | 311/105 |
| 3,379,398 | 4/1968 | Boccone | 248/188 |
| 3,749,343 | * 7/1973 | Marschak | 248/188 |
| 4,124,186 | * 11/1978 | Call, Sr. | 403/231 X |
| 4,345,849 | 8/1982 | Stenemann | 403/252 |
| 4,621,879 | * 11/1986 | Schneider | 403/205 X |
| 4,726,701 | * 2/1988 | Thomas | 403/205 X |
| 5,230,491 | 7/1993 | Tseng | 248/188.1 |
| 5,265,972 | 11/1993 | Bahr | 403/252 |
| 5,577,694 | 11/1996 | Lee | 248/188 |

FOREIGN PATENT DOCUMENTS

| | | | |
|---|---|---|---|
| 223684 | * 9/1959 | (AU) | 403/231 |
| 2332017 | * 1/1975 | (DE) | 403/231 |
| 2803056 | * 7/1979 | (DE) | 403/231 |
| 2845578 | * 4/1980 | (DE) | 403/231 |
| 826354 | 3/1938 | (FR) | 248/188 |

* cited by examiner

Primary Examiner—Harry C. Kim
(74) Attorney, Agent, or Firm—Price, Heneveld, Cooper, DeWitt & Litton

(57) ABSTRACT

A device comprising a corner strut (1) which has folding planes (2) and (2') therein, a connecting plane (3) and bolt holes (4, 5, and 5'), solid coupling stands (6 and 6') having a bearing face (7) therewith, and lateral struts (11 and 11') having supporting projections (14 and 14') therein. The coupling stands (6 and 6') are connected with the lateral struts (11 and 11') by inserting bolts (15 and 15') into bolt holes (9 and 9') and tightening them to flutes (12, 12', 13, and 13') of the lateral struts. Then, the coupling stands having the lateral struts connected therewith are combined with the corner strut by connecting the bearing face (7) of the coupling stands with the connecting plane (3) of the corner strut (1) by tightening bolts (10) wherein the coupling stands are facing the folding planes (2 and 2') of the corner strut (1).

4 Claims, 3 Drawing Sheets

DEVICE FOR COUPLING A CORNER STRUT BY ASSEMBLING COMPONENTS

BACKGROUND OF THE INVENTION

1. Field of the Invention

The present invention relates to a device for coupling a corner strut with lateral struts by assembling them through coupling stands, and more particularly, to a device for coupling a corner strut with lateral struts by assembling coupling stands which have the lateral struts connected therewith by bolts together with the corner strut promptly and correctly by bolts.

2. Description of the Related Art

The present invention relates to a device for coupling a corner strut with lateral struts by assembling them through coupling stands, and more particularly, to a device for coupling a corner strut with lateral struts. The said device is available for interior designs, desks, tables, various structures of aluminum material, display stands, showcases, and the like.

Most of conventional desks, tables, racks, display stands, and showcases having aluminum structures and the like are of a fixed type. Typically, metal products are fixed by welding or bolting connecting parts, and wood product are nailed or bolted. Other prior art is considerably convenient and ideal, but it requires a separate assembly having a square sleeve shape and therefore, different assemblies are separately needed according to the respective size, shape, pattern, etc. of struts, causing a high cost therefor which prevents the prior art from being widely available for various applications.

SUMMARY OF THE INVENTION

Therefore, an objective of the present invention is to provide a device for coupling a corner strut with lateral struts by assembling them through coupling stands, which removes and/or compliments fundamentally all the deficiencies of the conventional technology. This device comprises a corner strut 1 which has folding planes 2 and 2' therein, a connecting plane 3 and bolt holes 4, 5, and 5', solid coupling stands 6 and 6' having a bearing face 7 therewith, and lateral struts 11 and 11' having supporting projections 14 and 14' therein. The said coupling stands 6 and 6' are connected with the said lateral struts 11 and 11' by inserting bolts 15 and 15' into bolt holes 9 and 9' and tightening them to flutes 12, 12', 13, and 13' of the lateral struts. Then, the said coupling stands having the said lateral struts connected therewith are combined with the said corner strut by connecting the said bearing face 7 of the said coupling stands with the said connecting plane 3 of the said corner strut 1 by tightening bolts 10, wherein the said coupling stands are facing the folding planes 2 and 2' of the said corner strut 1.

Another objective is a device for supporting lateral struts comprising a corner strut having a first folding plane, a second folding plane, and a connecting plane disposed between the first and second folding planes. The device further includes a support having a first coupling stand and a second coupling stand for attachment to the lateral struts wherein the coupling stands are parallel to the first and second folding planes, respectively, and are interconnected by a bearing face which is substantially parallel to the connecting plane. The bearing face of the support is removably affixed to the connecting plane.

These and other features, advantages and objects of the present invention will be further understood and appreciated by those skilled in the art by reference to the following specification, claims and appended drawings.

DETAILED DESCRIPTION OF PREFERRED EMBODIMENT

Figure 1:
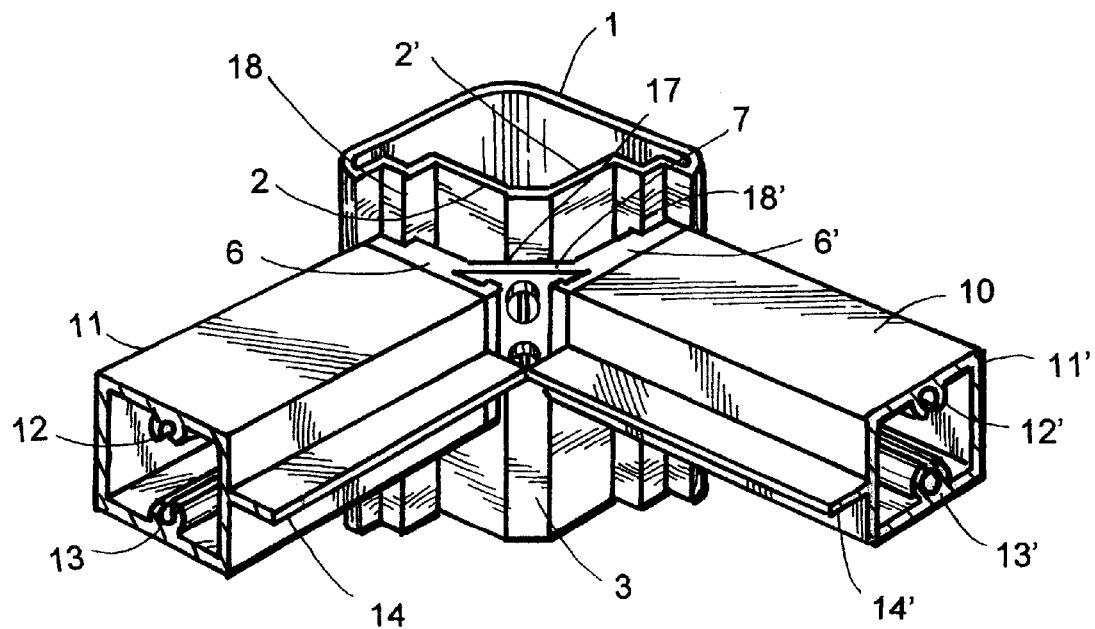
FIG. 1 is a perspective view showing a corner strut, coupling stands, and lateral struts combined in the present invention.

Hereinafter, the present invention will be described by way of illustrative examples with reference to the accompanying drawings.

As shown in FIGS. 1, 2, 5, and 6, this device comprises a corner strut 1 which has parallel shoulders 18 and 18', folding planes 2 and 2', a connecting plane 3 and bolt holes 4, 5, and 5' therein, and a support 17 comprising solid coupling stands 6 and 6' having recesses 19 and 19' at opposite ends of support 17 and further having a bearing face 7 therewith, and lateral struts 11 and 11' having supporting projections 14 and 14' thereon. The coupling stands 6 and 6' are connected with the lateral struts 11 and 11' by inserting bolts 15 and 15' into bolt holes 9 and 9' and tightening them to flutes 12, 12', 13, and 13' of the lateral struts. Then, the coupling stands having the lateral struts connected therewith are combined with the corner strut by connecting the bearing face 7 of the coupling stands with the connecting plane 3 of the corner strut 1 by tightening bolts 10, wherein the coupling stands are facing the folding planes 2 and 2' of the corner strut 1.

Figure 2:
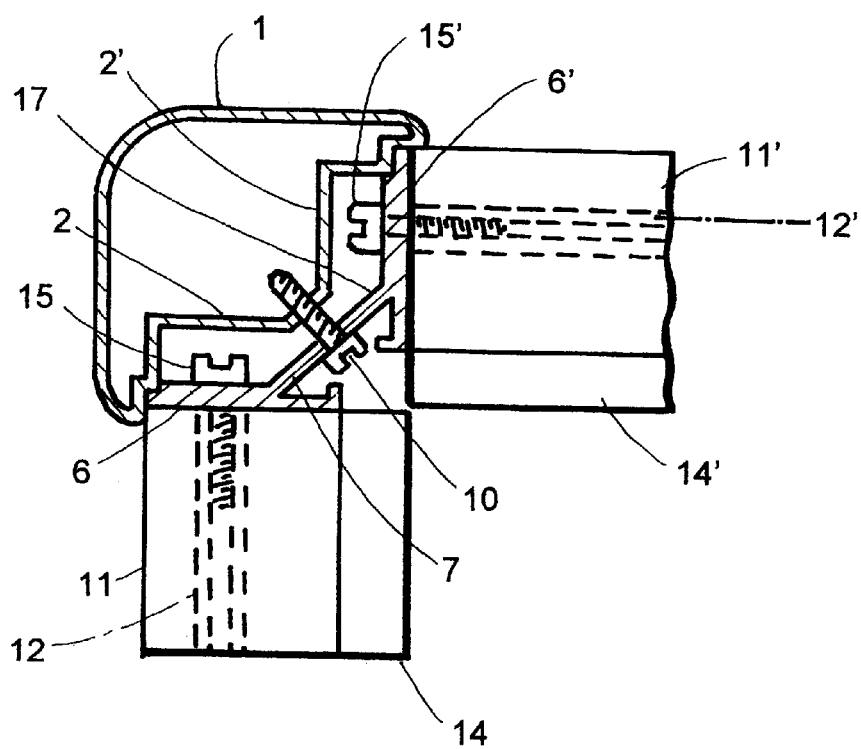
FIG. 2 is a partial cross-sectional plan view showing corner strut, coupling stands, and lateral struts combined in the present invention.
Figure 4:
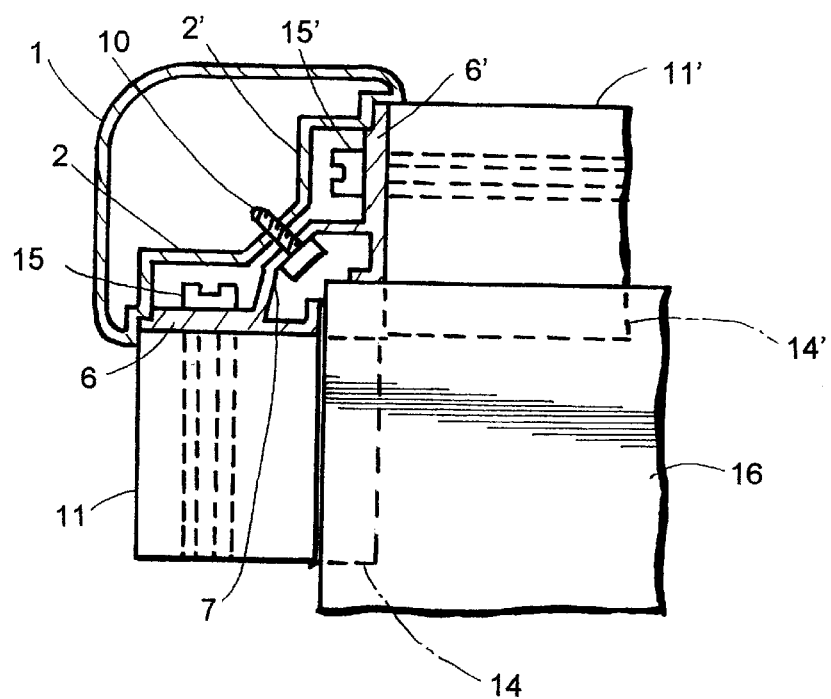
FIG. 4 is a partial cross-sectional plan view showing a shelf seated on the supporting projections of the lateral struts in the present device as completely assembled.
Figure 5:
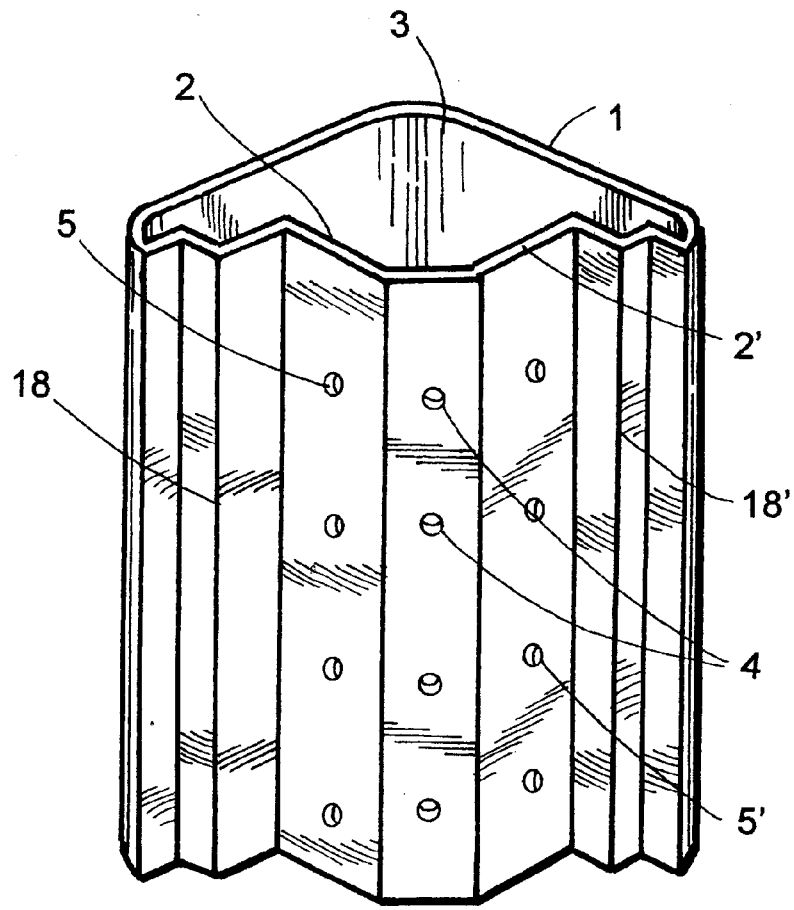
FIG. 5 is a perspective view illustrating the corner strut in the present invention.
Figure 6:
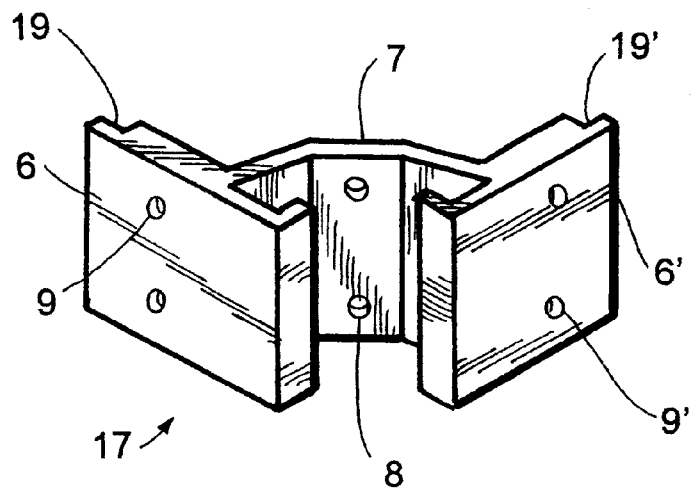
FIG. 6 is a perspective view illustrating an alternate embodiment of the coupling stands having an alternate bearing face.

Since the corner strut 1 comprises the folding planes 2 and 2' and the connecting plane 3, it is very easy to couple the corner strut with the coupling stands 6 and 6' by bolts. Particularly, the lateral struts 11 and 11', which are cut off to length as necessary, are connected with the coupling stands 6 and 6', applicable bolts 15 and 15' then are inserted into the bolt holes 9 and 9' and further tightened to the flutes 12, 12', 13, and 13' of the lateral struts. Thereby, the lateral struts 11 and 11' are closely and firmly combined with the coupling stands 6 and 6' like one solid body. Then, the bearing face 7 of the coupling stands is connected with the connecting plane 3 of the corner strut 1 as shown in FIGS. 2 and 4, and the bolts 10 are inserted and tightened through both the bolt holes 8 of the bearing face and the bolt holes 4 of the connecting plane 3. The recesses 19 and 19' bear against shoulders 18 and 18'. Thereby, the lateral struts 11 and 11' are closely and firmly connected with the corner strut 1, and the solid coupling stands 6 and 6' having the bearing face 7 therewith, as shown in FIG. 6, are connected longitudinally with the corner strut 1.

Figure 3:
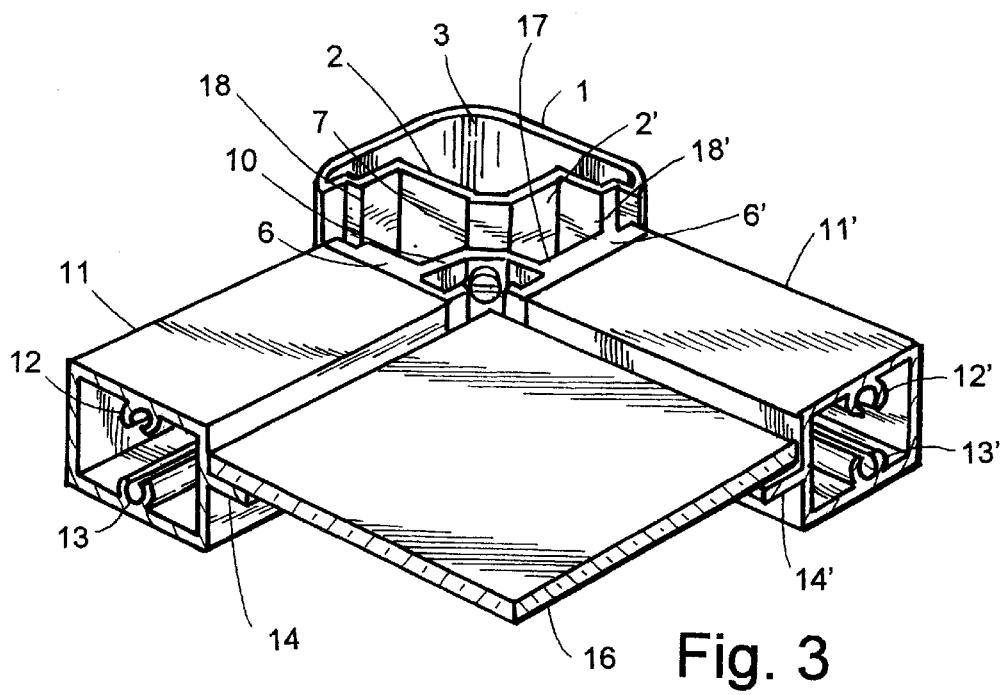
FIG. 3 is a perspective view showing a shelf seated on the supporting projections of the lateral struts in the present device as completely assembled.

When the device is completely assembled, a shelf 16 made of a board, etc. is seated on the supporting projections 14 and 14' for using this device as necessary. The bearing face 7 of the coupling stands can be formed in a straight plane as shown in FIGS. 1 and 2, or it can be formed in a curved plane as shown in FIGS. 3, 4, and 6. There is no difference in effect between the two shapes.

According to this invention, the corner strut having a given shape, the coupling stands and the lateral struts can be assembled or dismantled promptly and correctly as necessary, and further, once the device is completely assembled the parts will remain firmly assembled. Therefore, this device can be used effectively for desks, tables, working stands, display stands, showcases, and various structures in interior designs.

The above description is considered that of the preferred embodiment(s) only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A coupling device comprising:

a corner strut having folding planes, a connecting plane between said folding planes, and a first plurality of bolt holes formed in the folding planes and the connecting plane;

solid coupling stands having a bearing face therewith and a second plurality of bolt holes formed therein; and lateral struts having supporting projections therein;

wherein said coupling stands are connected with the said lateral struts having supporting projections therein by inserting a first plurality of bolts into said first plurality of bolt holes and tightening them to flutes of the lateral struts, and then, said coupling stands having said lateral struts connected therewith are combined with said corner strut by connecting said bearing face of said coupling stands with said connecting plane of said corner strut by tightening a second plurality of bolts while said coupling stands are facing the folding planes of the said corner strut.

2. A device for supporting lateral struts comprising:

a corner strut having a first folding plane, a second folding plane, and a connecting plane disposed between said first and second folding planes; and a support having a first coupling stand and a second coupling stand for attachment to the lateral struts wherein said first and second coupling stands are substantially parallel to said first and second folding planes, respectively, and interconnected therebetween by a bearing face substantially parallel to said connecting plane, said bearing face is removably affixed to said connecting plane with a fastener;

wherein said connecting plane has a plurality of holes therealong to permit the selective attachment of said support therealong.

3. The device according to claim 2, wherein said corner strut includes parallel shoulders substantially parallel to said first and second folding planes, and opposing ends of said support bear on said shoulders when said bearing face is affixed to said connecting plane.

4. The device according to claim 3, wherein said support includes recesses at said opposing ends thereof, said recesses bearing on said shoulders when said bearing face is affixed to said connecting plane.

* * * * *